United States Patent [19]

Burkarth

[11] Patent Number: 5,171,084

[45] Date of Patent: Dec. 15, 1992

[54] APPARATUS FOR DIFFUSING LIGHT AND DIRECTING AIR CIRCULATION

[75] Inventor: Jack Burkarth, Dallas, Tex.

[73] Assignee: Gulton Industries, Inc., Plano, Tex.

[21] Appl. No.: 786,116

[22] Filed: Nov. 1, 1991

Related U.S. Application Data

[63] Continuation-in-part of Ser. No. 782,244, Oct. 25, 1991, abandoned, and a continuation-in-part of Ser. No. 654,821, Feb. 13, 1991, which is a continuation of Ser. No. 412,828, Sep. 26, 1989, Pat. No. 5,038,256, which is a continuation-in-part of Ser. No. 129,258, Dec. 7, 1987, Pat. No. 4,907,142.

[51] Int. Cl.$^5$ .......................... B60Q 3/00; F21V 33/00
[52] U.S. Cl. .......................... 362/74; 362/96; 362/149; 362/218
[58] Field of Search .................. 362/74, 96, 149, 218, 362/254, 260, 290, 373

[56] References Cited

U.S. PATENT DOCUMENTS

| | | |
|---|---|---|
| 1,706,694 | 3/1929 | Kimbel .................. 362/74 |
| 1,934,998 | 11/1933 | Stahlknecht ............ 362/74 |
| 2,238,847 | 4/1941 | Dreyfuss . |
| 2,284,534 | 5/1942 | Orth . |
| 2,587,807 | 3/1952 | Arenberg et al. . |
| 2,845,854 | 8/1958 | Kurek . |
| 3,035,161 | 5/1962 | Kalt . |
| 3,101,038 | 8/1963 | Archer . |
| 3,152,277 | 10/1964 | Cutler et al. . |
| 3,210,875 | 10/1965 | Schwenkler . |
| 3,211,904 | 10/1965 | Schwenkler . |
| 3,246,137 | 4/1966 | Zagel . |
| 3,326,112 | 6/1967 | Sadlow et al. ......... 362/96 |
| 3,348,465 | 10/1967 | Kruger ............... 362/96 |
| 3,498,206 | 3/1970 | Rackley ............... 362/96 |
| 4,157,584 | 6/1979 | Bhatt . |
| 4,352,323 | 10/1982 | Burkarth . |
| 4,387,415 | 6/1983 | Domas . |
| 4,425,603 | 1/1984 | Courson . |
| 4,499,815 | 2/1985 | Burkarth . |
| 4,574,336 | 3/1986 | Mikalonis . |
| 4,625,267 | 11/1986 | Mikalonis . |
| 4,681,024 | 7/1987 | Ivey ................. 362/149 |
| 4,907,142 | 3/1990 | Burkarth . |
| 4,926,293 | 5/1990 | Saba ................. 362/96 |
| 5,038,256 | 8/1991 | Burkarth . |

Primary Examiner—Richard R. Cole
Attorney, Agent, or Firm—Darby & Darby

[57] ABSTRACT

An apparatus for diffusing light and for directing circulation of air. A support (3), a grill panel (2) and a socket (12) are mounted together to form the apparatus. The support (30) is mounted to a base (64, 68). A nozzle (94) within the base (64, 68) creates a venturi effect by providing an emerging airstream which causes air to flow upward through the grill panel and then out to mix with the emerging air-stream. The grill panel (2) is cleaned of particulate matter because of the flow of the air through the grill panel. The emerging airstream travels in the same direction that it travelled when passing from the inlet to the outlet of the nozzle.

17 Claims, 4 Drawing Sheets

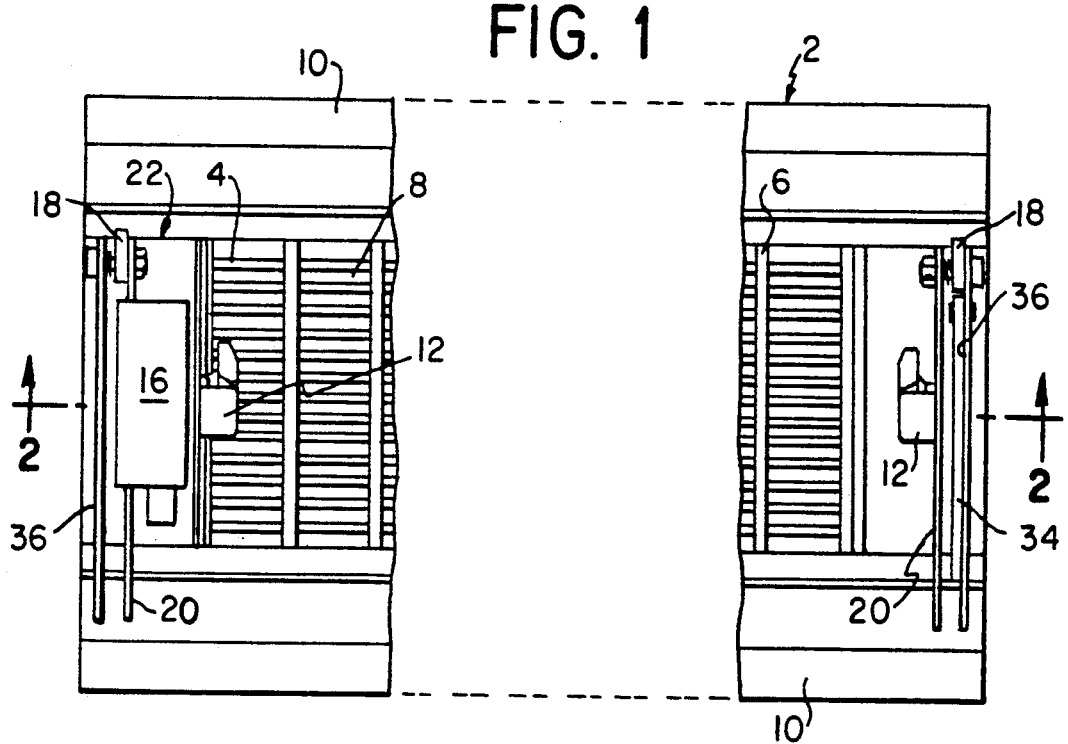
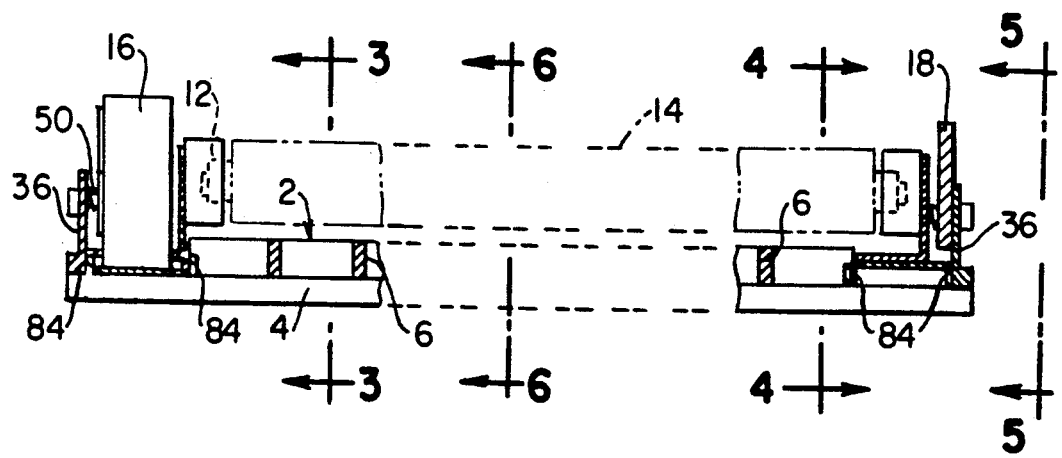

APPARATUS FOR DIFFUSING LIGHT AND DIRECTING AIR CIRCULATION

CROSS-REFERENCE TO COPENDING APPLICATIONS

This is a continuation-in-part of the application filed Oct. 25, 1991 entitled "APPARATUS FOR DIFFUSING LIGHT AND DIRECTING AIR CIRCULATION" in the name of Jack Burkarth and is a continuation-in-part of Ser. No. 07/654,821 filed Feb. 13, 1991, which is a continuation of Ser. No. 7/412,828, filed Sep. 26, 1989 now U.S. Pat. No. 5,038,256, which is a continuation-in-part of 07/129,258, filed Dec. 7, 1987 now U.S. Pat. No. 4,807,142.

BACKGROUND OF THE INVENTION

A. Field of the Invention

The present invention relates to an apparatus, such as a lighting fixture, for diffusing light and for passing air through the fixture for cleaning it. Preferably, the fixture is used in public vehicles, such as subway or rail cars.

B. Description of the Related Art

Traditionally, lighting fixtures in public vehicles such as rail or subway cars have had sealed plastic lens covers, whose effectiveness as a seal against the collection of dirt is questionable because of the breathing action of the fixtures which is induced by temperature and pressure changes. Fixtures cannot as a practical matter be hermetically sealed; hence, films collect on the inside surfaces which become unsightly when illuminated. It has therefore become desirable to continuously clean the fixtures so as to avoid accumulation of films, dust, or other particulate matter.

A lighting fixture which sucks air through the fixture for cleaning out dust particles and the like is known from U.S. Pat. Nos. 4,352,323; 4,499,815; 4,907,142, 5,038,256 and U.S. patent application Ser. No. 654,821 which is expected to issue shortly. Such a fixture includes a base, a fluorescent lamp, and a panel with openings through which the light from the lamp diffuses. The base, lamp and panel are mounted together such that the lamp is between the base and diffuser panel. The base may have a nozzle through which a high velocity airstream is directed to flow parallel to the base and to emerge to the side of the fixture. This creates a venturi effect which sucks air through the fixture from the panel openings.

The panel may be in the form of a plurality of elongated cylindrical light-diffusing rods which are spaced from each other in the transverse direction. The rods may be transparent, translucent or reflective. Further, the panel may pivot from a closed position to an open position relative to the base to enable easy access to the lamp and/or ballast for service or replacement.

While such a fixture is suitable for use in moving vehicles, the assembly of the panel of cylindrical light diffusing rods is somewhat cumbersome. The use of transparent or translucent material for the rods means that the accumulation of any dust or film on them is readily noticeable.

Lighting fixtures which have open grills that are louvered and made of metal and other opaque materials have been used in offices, stores, schools, and other such facilities, as opposed to rail cars or other moving vehicles. Such open grill lamp fixtures help avoid the collection of insects and dirt because they are open. Cleaning, if needed, may be accomplished by a dusting brush.

It would be desirable to apply this open grill feature into a self-cleaning lighting fixture which promotes air mixing for effecting temperature equilibrium within an enclosure, such as a car of a public vehicle.

SUMMARY OF THE INVENTION

The present invention is directed to a lighting fixture apparatus which includes a base, a lighting fixture panel, one or more sockets, and a nozzle. The base, panel and sockets are mounted together so that the base and the lighting fixture panel are spaced apart with the sockets in between. The panel has openings through which air may flow to clean and cool the panel. Light diffuses through the openings.

The nozzle creates a venturi effect by providing an emerging airstream which causes air to flow upward through the panel openings and out to mix with the airstream. The nozzle may be incorporated in the base or next to it.

Preferably, the light fixture panel diffuses light to allow for attaining desired light intensities, such as of 25 foot candles on the reading plane, by both direct and indirect light beam patterns, which improve passenger eye comfort. Low contrast brightness ratios between the fixture surface and the adjacent ceiling area are provided by the lighting fixture panel. Lamp brightness may be shielded from direct sight by baffles, ribs or light-scattering rods.

The light fixture panel may serve as a linear air diffuser which satisfies various criteria to efficiently discharge conditioned air. These criteria may include delivery of reasonably consistent air volume throughout the length of the diffuser, air nozzle velocities which are sufficiently low to ensure that noise is not generated, air directional control to limit average impingement velocities to desired levels (e.g., 75 feet per minute) at passenger head levels, mixture of delivered turbulent (such as 50° F. to 60° F.) air with the ambient (such as 75° F. to 85° F.) air so that the temperature differences within a predetermined (e.g., 6 inch) level are reduced to a predetermined value (e.g., one-half), and limitation of the static pressure drop across the diffuser such that it does not cause an unreasonably high load on the air supply fans.

BRIEF DESCRIPTION OF THE DRAWINGS

For a better understanding of the present invention, reference is made to the following description and accompanying drawings, while the scope of the invention is set forth in the appended claims.

FIG. 1 is a top plan view of the lighting fixture apparatus in accordance with the invention.

FIG. 2 is a cross-section of the movable portions of the fixture taken along section lines 2—2 of FIG. 1.

DESCRIPTION OF THE PREFERRED EMBODIMENT

Figure 3:
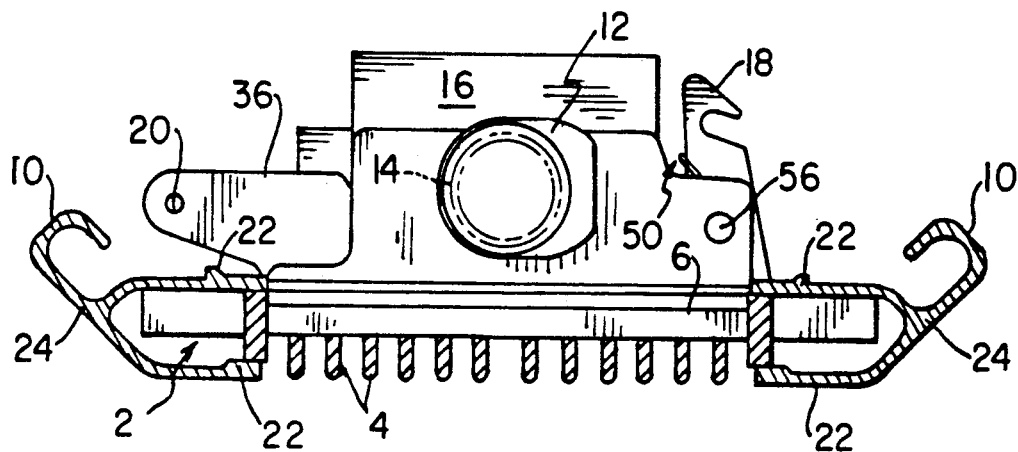
FIGS. 3 and 4 are similar cross-sections taken along section lines 3—3 and 4—4, respectively, of FIG. 2.

FIGS. 1-5 show a grill panel 2 which has elongated bars or elements 4 which extend in the direction of the length of the panel and lie in a plane. The panel 2 also has transversely extending ribs 6, which are recessed to extend upwardly from the elements 4 and out of the plane. Together, the elements 4 and the ribs 6 define a grill pattern having openings 8. On each longitudinally extending side of the grill pattern is a hook-like projection 10, best seen in FIGS. 3-5, which serve as a handrail.

The elongated elements 4 and the recessed ribs 6 together form a grid-like surface pattern, which hides undesirable surface irregularities of the structure and fluorescent tube, thereby contributing to the interior decor of the car as light impinges the surface pattern. The elements 4 and ribs 6 need not be integral with each other; rather, they may be secured to each other after fabrication of each separately.

Extending from the panel are opposed lamp holders or sockets 12, which are at a higher elevation than the grill elements 4 and ribs 6. An elongated florescent lamp tube 14 (see in FIG. 2) is inserted between the two sockets 12 and is secured to them. A conventional ballast is provided within enclosure 16 to include conventional starting and protection circuitry. Although two sockets are shown, one alone may suffice.

A latch 18 is provided at each longitudinal end of the lighting fixture to releasably engage a respective arm 30 (shown in FIG. 6) which has a pivot 62 at one end pivotally connected at respective pivot hole 20 of element 36. Each end of the panel 2 is held between a respective pair of legs 22 of a side rail 11. Each pair of legs 22 come together at a location 24, from which extends the respective hook-like projection 10. The rails 11 mirror one other by extending outward from either side of the panel and may run the full length of the panel.

Figure 4:
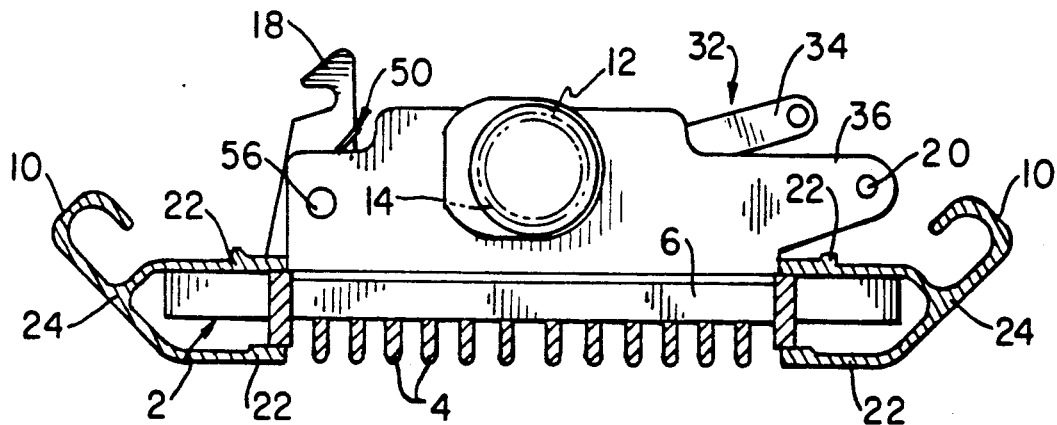
Figure 5:
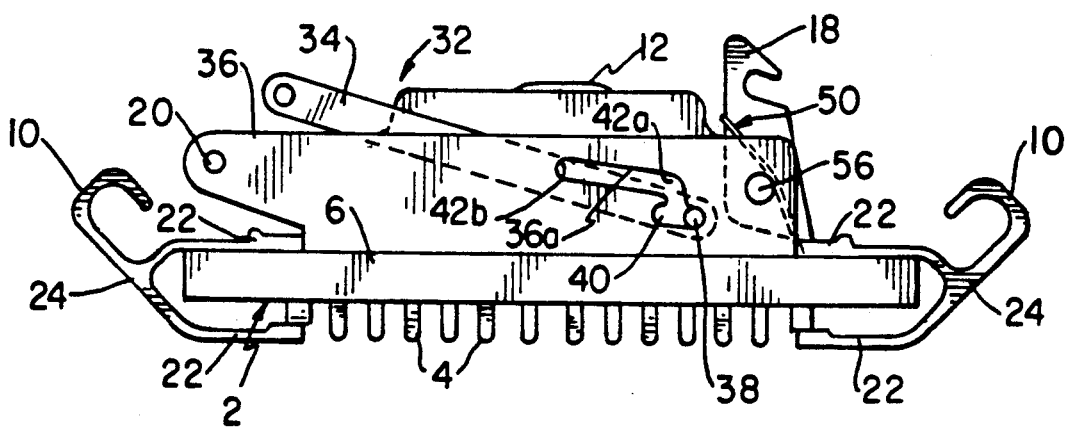
FIG. 5 is an end elevational view of the movable fixture portion taken in the direction of arrow lines 5—5 of FIG. 2.

FIGS. 4 and 5 show a conventional rotation-limiting mechanism 32 to prevent the panel 2, when unlatched, from immediately dropping to a fully rotated position and is of the same type as is disclosed in U.S. Pat. No. 4,907,142. The mechanism includes a rod 34 pivoted at one end to support 30 (FIG. 6) at pin 33, and an element 36 with a camming groove 36a. The shape of the camming groove 36a is such that, when the panel 2 is opened, a cam pin 38 at the other end of the rod 34 will travel only a short distance between position 40 and the position shown in FIG. 5. In order to obtain full descent of the panel, it is necessary to raise the panel slightly to allow the cam 38 to travel to position 42a in order to eventually reach the position 42b.

Figure 6:
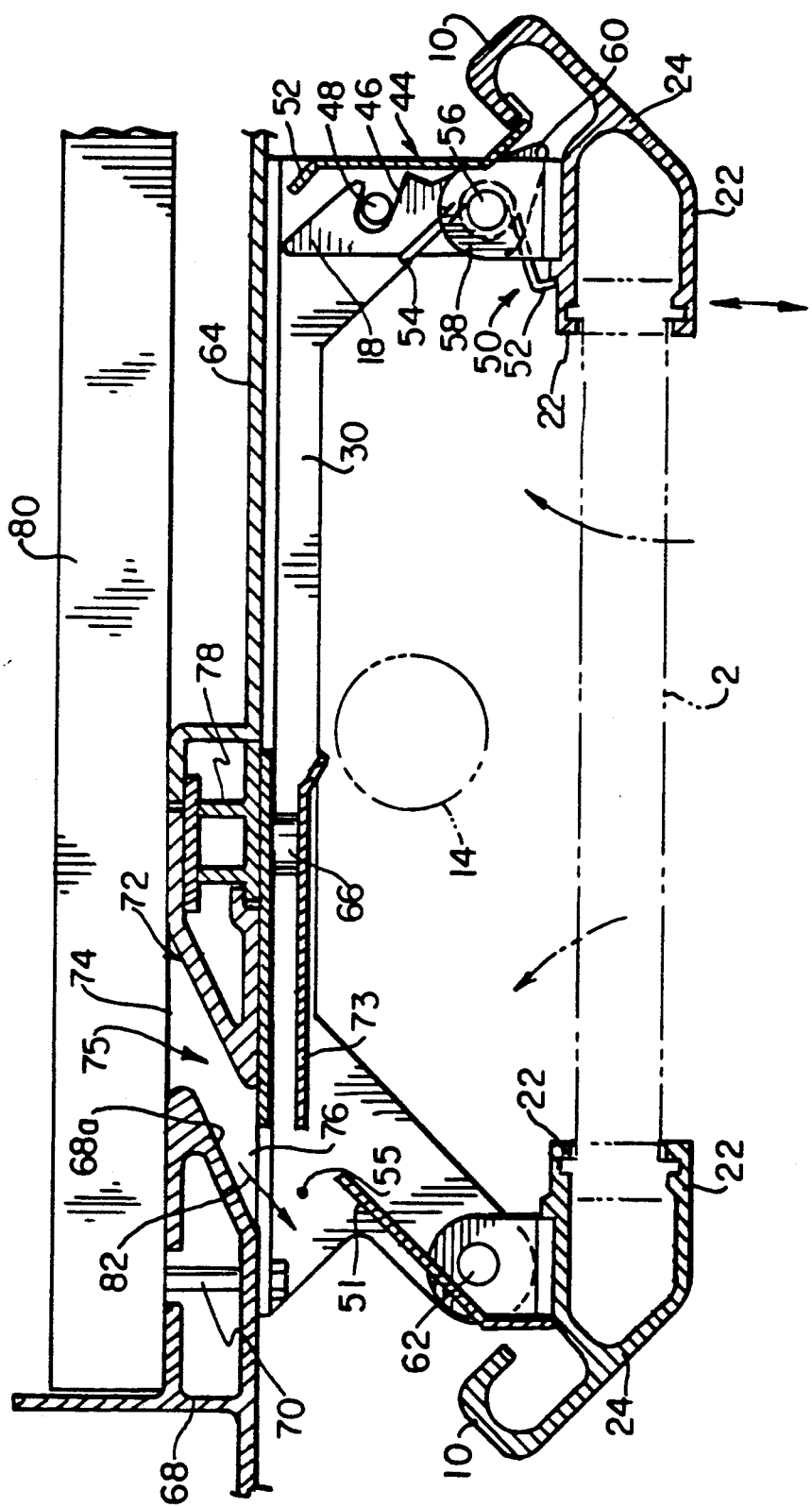
FIG. 6 is a cross-section taken along section lines 6—6 of FIG. 2 but further shows the lighting fixture mounted to a ceiling.

FIG. 6 shows the lighting fixture of the invention as installed. The hinging and latching mechanism 44 is preferably a quick-release type and includes the latch 18 which has a slot 46. A pin 48 on the support 30 engages with the slot 46 in the locked position. A spring 50 biases the latch 18 into the locked position.

A respective cover element 52 has an end engagable with a respective hook-like projection 10 and prevents unauthorized access to the interior, because (by means not shown) a special tool is needed to disengage the cover element. The respective cover element 52 covers the latch mechanism at each end of the fixture and may extend the full length of the lighting fixture. The cover element 52 is adjacent to the latch 18 when the panel 2 is closed.

A cover element 51 is also provided on the other side at both ends to prevent access to the interior ends of the lighting fixture. Cover element 51 may mirror the length and shape of cover element 52. Air circulation takes place through a space 55 between the cover element 51 and the support 30.

The cover element 51 may have openings or may be situated at each end of the light fixture to leave a space inbetween. This enables air to flow through the lighting fixture to pass through the openings or space and then mix with the emerging airstream from the nozzle.

The spring 50 has one end 53 bearing against an upper one of the legs 22 and is rotatable at its center about a peg projection 56 on a stop element 58, which has a tapered end 60 which engages the hook-like projection 10 to prevent the latch 18 from biasing too far so that it remains in a generally vertical position. The other end 54 of the spring bears on the latch 18. After removal of the cover element 52 to enable the latch 18 to be disengaged from the pin 48, the latch side of the panel may drop downward by pivoting at the other side about pivot 62.

The support 30 is secured to a first base element 64 via various connecting elements 66 and to a second base element 68 via various connecting elements 70. A nozzle element 72, which separates the base elements 64 and 68, defines a nozzle passage 75 bounded between nozzle element 72 and a sidewall 68a of second base element 68. A retainer element 78 retains the nozzle element 72 and the base 64 between the support 30 and a ceiling structural support 80. The uppermost part of the passage 75 defines an inlet 74 and the lowermost part of the passage 75 defines an outlet 76. The width of the passage narrows gradually from the inlet to the outlet. A high velocity airstream flows from the inlet to the outlet in the direction of arrow 82 and emerges alongside the panel 2. This airstream may be supplied from supply ducts (not shown) to provide forced heating or cooling air for maintaining the inside temperature of the vehicle.

The panel 2 functions as both light and air diffuser. The spaced-apart elongated elements 4 and ribs 6 which comprise the grill pattern permit air flow around them for purposes of cooling and self-cleaning. The light emitted by the lamp 14 is diffused by the elongated elements 4 and ribs 6 as it passes through the grill pattern.

A venturi effect is created by the high velocity airstream which emerges from the nozzle. This results in air beneath the panel becoming inducted upward through the grill pattern to be combined with the high velocity air exiting from the nozzle for improved mixing of incoming air and re-circulated air. The high velocity air is of a type for producing forced heating or cooling for effecting temperature equilibrium inside the car. The grill pattern of plastic material provides a higher thermal resistance than the conventional metal honeycomb panel so that the qualities of insulation and condensation prevention are improved.

It has been found that the placement of lighting fixtures on the ceiling of a railway car or the like allows their venturi effect to cause circulation of warmer or "stale" air that otherwise collects at the upper strata of the aisles in the car. In a preferred embodiment, a ceiling structural support 80 is attached to a vertically extending structural member 86, which in turn is attached at its upper end to the ceiling 88 of the car of the public vehicle.

If the prior nozzle orientation shown in U.S. Pat. No. 4,907,142 were employed where the high velocity airstream is directed to flow substantially parallel to the base, the result would be that the emerging air may blow at high velocities along the walls of the railway car. To promote better diffusion of air circulation where passengers are instead of along the walls, the nozzle has been modified to direct air flow at an oblique angle sideways relative to the base so that the air flow clears the panel 2.

The outlet 76 may be directly above an end of the panel 2, but the incline of the nozzle directs the air downwardly and outwardly to the side, rather than directly vertically downward or directly horizontally to the side and parallel to the base. In this manner, the direction of flow of the emerging airstream is the same as its flow through the nozzle and a lower impingement air velocity may be used because the diffusion is better than for the case where the airstream is directed to flow parallel to the base.

The rate of airflow through the nozzle may be varied either by limiting the airflow supplied by a fan to the nozzle or by adjustably blocking the airflow reaching the area for creating the venturi effect. For instance, to lessen the amount of the airstream emerging from the nozzle which can create the venturi effect for mixing, a closure member 73 may be slid horizontally to an appropriate relative position beneath the outlet 76 to block a portion of the free flow of the emerging airstream. The closure member 73 is secured to the base 64 via connector 66. As an alternative, the air entering the nozzle inlet 74 may be partially blocked in a similar manner upstream.

An exemplary lighting fixture system for a subway car may use 1520 total lamp watts to provide 129,600 total lumens (where the ballast operates the lamp at full rated current), or 85.26 lumens/watt. The lamp may be a bi-pin type T10 (1.25 diameter) as manufactured by Phillips. Other lamp models may be used such as F40AX41 and F40BX/SPX35/RS.

The grill panel may be made of transparent or opaque plastic, or die cast aluminum or other metal or alloy. In one preferred form the grill panel is made of aluminum sheet material.

There are positions where light entering is weakened due to the presence of elements which obstruct light and air, i.e., lamp sockets, ballasts, and the door hinging and latching mechanism. The use of less deep ribs 84, whose height is less than that of the ribs 6, (see FIG. 2) is recommended at these positions to overcome absence of light at these positions.

Figure 7:
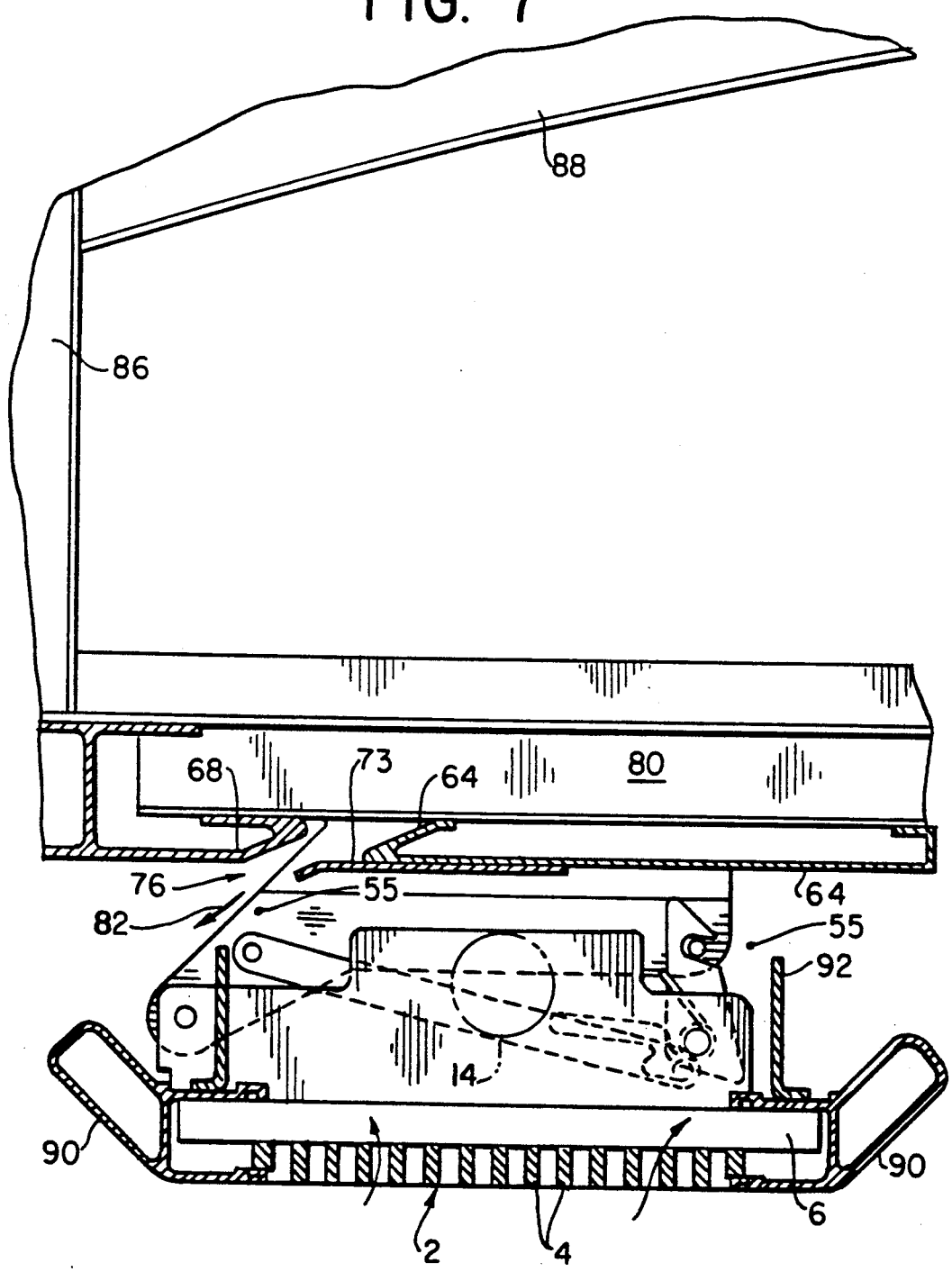
FIG. 7 is a cross-section similar to FIG. 6 but for another embodiment, and further showing attachment to a low ceiling within a car of a public vehicle.

FIG. 7 shows another embodiment of the light fixture which is the same as that of the embodiment of FIG. 6 except that closed rails 90 replace the hook-like rails 10 and employs two cover elements 92, each of which extend along a respective side as shown, leaving a gap or space 55 at its upper edge. Each cover element 92 is attached to a respective upper leg 22 and prevents access to the interior of the fixture. The cover elements 92 may be transparent or translucent to permit light to be directed sideways of a fixture. These elements 92 may be formed as linear Fresnel lenses to provide desired light patterns. A nozzle passage 75 is shown which may be considered to be the same as that shown in FIG. 6. The airstream emerging from the nozzle exit 76 mixes with air sucked through the panel and out through the space 55.

For the embodiments of FIGS. 6 and 7, only one nozzle is shown on one side of the lighting fixture. However, another nozzle may be provided on the other side so that the air circulation through the fixture will split to leave in opposite directions. Each portion of the air will mix with the emerging airstream from a respective nozzle.

The grill panel 2 may be in the form of any other type of panel which diffuses light and has openings through which air may flow for cleaning and cooling the panel.

While the foregoing description and drawings represent the preferred embodiments of the present invention, it will be understood that various changes and modifications may be made without departing from the spirit and scope of the present invention.

What is claimed is:

1. An apparatus for diffusing light and for directing circulation of air, comprising:
   a support;
   panel means for diffusing light and for enabling air to flow through the panel means;
   a socket adapted for holding an end of a fluorescent lamp;
   means for mounting together the support, panel means and socket so that the support and the panel means are spaced apart with the socket between the support and the panel means; and
   nozzle means for creating a venturi effect by providing an emerging airstream which causes air to flow upward through the panel means and then out to mix with the emerging airstream, whereby the panel means is cleaned of particulate matter because of the flow of the air through the panel means caused by the venturi effect, the nozzle means having an inlet and an outlet for directing the airstream to flow from the inlet to emerge through the outlet in a direction which avoids directly impinging the panel, the nozzle means defining an elongated passage between the inlet and the outlet, the passage being inclined relative to the support for directing the airstream when exiting the nozzle to flow in a same direction as that travelled when flowing from the inlet to the outlet.

2. The apparatus as in claim 1, wherein the nozzle means narrows in diameter from the inlet to the outlet.

3. The apparatus as in claim 1, wherein the passage is inclined to direct the airstream to flow substantially nonparallel to the base from the inlet to the outlet for an entire length of the passage.

4. The apparatus as in claim 1, further comprising a lamp held by the socket, the lamp providing illumination so that direct and indirect beam patterns are produced through the panel means which generate intensities of at least about 25 foot candles on a reading plane which is beneath the panel means.

5. The apparatus as in claim 1, further comprising means for adjusting an amount of the airstream emerging from the nozzle means that may create the venturi effect.

6. The apparatus as in claim 5, wherein said adjusting means includes an element which extends from the support and beneath the outlet for blocking a portion of the emerging airstream.

7. The apparatus as in claim 1, further comprising a base to which is secured the support, and a structural member which extends upward from the base so that a free space is defined over the base along the height of the structural member, whereby air within the free space may be removed to avoid being mixed with the airstream.

8. The apparatus as in claim 7, wherein the nozzle means is incorporated into the base.

9. The apparatus as in claim 1, wherein the nozzle means provides an air velocity which is sufficiently low to cause reduction in a level of noise that may be heard from the airstream.

10. The apparatus as in claim 1, wherein the nozzle means is configured and arranged for limiting impingement air velocities to at most about 75 feet per minute at passenger head levels.

11. The apparatus as in claim 1, wherein the nozzle means enables mixing of delivered turbulent air at 50° F. to 60° F. with the ambient air at 75° F. to 85° F. so that the temperature differences within a 6 inch level are reduced.

12. The apparatus as in claim 1, wherein the panel means comprises a grill panel with a plurality of elongated elements spaced apart from each other transversely in a plane and a plurality of recessed ribs spaced apart from each other and extending longitudinally in a direction transverse to the direction of elongation of the elements and extending out of the plane.

13. The apparatus as in claim 12, further comprising an obstruction element which obstructs light and air flow, the obstruction element being adjacent the socket; and extension from the panel which is beneath the obstruction element; and a secondary rib which is recessed from the extension and which extends out of the plane to reach an elevation which is lower than that of the ribs.

14. The apparatus as in claim 13, wherein the ribs are spaced equidistant from each other in succession so as to define an equidistant distance between a successive two of the ribs, the secondary rib and one of the ribs which is closest to the secondary rib defining a distance therebetween which is the same size as the equidistant distance.

15. The apparatus as in claim 1, wherein the ribs are spaced equidistant from each other in succession.

16. The apparatus as in claim 1, further comprising a cover element extending along each side of said apparatus for guiding the air upwardly through said panel into the path of the airstream emerging from said nozzle means.

17. The apparatus as in claim 16, wherein said cover elements are light-transmitting for providing a desired light pattern adjacent said apparatus.

* * * * *